(12) United States Patent
Kennedy et al.

(10) Patent No.: US 7,569,652 B2
(45) Date of Patent: Aug. 4, 2009

(54) SYNTHESIS AND CHARACTERIZATION OF NOVEL CYCLOSILOXANES AND THEIR SELF- AND CO-CONDENSATION WITH SILANOL-TERMINATED POLYDIMETHYLSILOXANE

(75) Inventors: Joseph P. Kennedy, Akron, OH (US); Jeremy Daum, Lexington, KY (US); Gabor Erdodi, Akron, OH (US)

(73) Assignee: The University of Akron, Akron, OH (US)

( * ) Notice: Subject to any disclaimer, the term of this patent is extended or adjusted under 35 U.S.C. 154(b) by 172 days.

(21) Appl. No.: 11/209,136

(22) Filed: Aug. 22, 2005

(65) Prior Publication Data

US 2006/0041098 A1    Feb. 23, 2006

Related U.S. Application Data

(60) Provisional application No. 60/603,079, filed on Aug. 20, 2004.

(51) Int. Cl.
 *C08G 77/14*    (2006.01)
(52) U.S. Cl. .......................................... 528/37; 556/460
(58) Field of Classification Search ........................ None
 See application file for complete search history.

(56) References Cited

U.S. PATENT DOCUMENTS 3,440,205 A * 4/1969 Pande et al. ................. 524/863
3,969,310 A * 7/1976 Itoh et al. .................... 524/862

FOREIGN PATENT DOCUMENTS

| SU | 566852 | 7/1977 |
|---|---|---|
| SU | 1126579 | 11/1984 |

OTHER PUBLICATIONS

Abstract for an article entitled "Synthesis of Dimethylcyclosiloxanes containing an Acyl Group at the Silicon Atom" authored by Adrianov et al. and published in Zhurnal Obshchei Khimii (1966), 36(8), 1477-78.*
Synthesis of Organocyclotrisiloxanes with Functional Groups at the Silicon Atom: authored by Zachernyuk et al. and published in Zhurnal Obshchei Khimii (1985), 55(6), pp. 1368-1376.*
Makarova, N.N., Mesomorphic Cyclolinear Organosiloxane and Organocarbosiloxane Block Copolymers, Polymer Science, 1993.
Makarova, N.N., Liquid Crystalline Cyclochain Organosilicon Compounds, Prog. Polym. Sci., vol. 22, pp. 1001-1052, 1997, Great Britain.
Sautter, E., Langmuir-Blodgett Films of Novel Mesophase Polysiloxanes, Polymer Science, vol. 38, 1996.
Buzin, A.I., Influence of Molecular Weight on Langmuir Monolayers, Colloid Polym Sci 276, 1998.
Godovsky, Y.K., The Cyclolinear Polyorganosiloxanes, Makromol. Chem., Macromol. Symp. 26, 1989.
Makarova, N.N., Synthesis and Structure of Cyclolinear Polyorganosiloxanes, Polymer Science, vol. 37, 1995.

* cited by examiner

*Primary Examiner*—Marc S Zimmer
(74) *Attorney, Agent, or Firm*—Roetzel & Andress, LPA; Joseph J. Crimaldi

(57) ABSTRACT

The present invention is directed to syntheses of cyclolinear networks. Two novel cyclic siloxanes were used as starting materials. The cyclic siloxanes are self-condensed and co-condensed with silanol-terminated polydimethylsiloxane to vinyl-terminated cyclolinear polymers. Cyclolinear networks can be synthesized by hydrosilylation of vinyl-terminated cyclolinear polyorganosiloxanes with a copolymer of dimethylsiloxane and methylhydrosiloxane.

38 Claims, 6 Drawing Sheets

SYNTHESIS AND CHARACTERIZATION OF NOVEL CYCLOSILOXANES AND THEIR SELF- AND CO-CONDENSATION WITH SILANOL-TERMINATED POLYDIMETHYLSILOXANE

RELATED APPLICATION DATA

This application claims priority to previously filed U.S. Provisional Application No. 60/603,079, filed on Aug. 20, 2004, entitled "Synthesis and Characterization of Novel Cyclosiloxanes and their Self- and Co-Condensation with Silanol-Terminated Polydimethylsiloxane," which is hereby incorporated by reference in its entirety.

BACKGROUND OF THE INVENTION

The invention relates generally to the synthesis and characterization of cyclosiloxanes, and more particularly to the self-condensation and co-condensation of cyclosiloxanes to cyclolinear polymers.

Cyclic siloxane compounds are known crosslinking agents that exhibit high thermal stability. At least two publications describe the synthesis of cyclolinear polymers, namely Makarova, N. N.; Petrova, I. M.; Godovskii, Y. K.; Zhdanov, A., "Stereoregular polyorganocyclosiloxanes—soluble liquid-crystal polymers with a wide range of mesomorphic state", Russian Patent No. SUI 126579, 11/30/1984; and Andrianov, K. A.; Makarova, N. N.; Popova, T. V., "Polycyclic siloxane hydraulic fluids", Russian Patent No. SU566852, 7/30/1977.

Early research into polyorganosiloxane compounds to this point has been focused on their spreading behavior, see for example, Makarova, N. N.; Astapova, T. V.; Godovskii, Y. K.; Matukhina, E. V.; Lavrukhin, B. D.; Yakubovich, O. V., Vysokomolekulyarnye Soedineniya, Seriya A 1993, 35, 190-194; Makarova, N. N.; Godovsky, Y. K. Progress in Polymer Science 1997, 22, 1001-1052; Sautter, E.; Belousov, S. I.; Pechhold, W.; Makarova, N. N.; Godovskii, Y. K. Vysokomolekulyarnye Soedineniya, Seriya A i Seriya B 1996, 38, 49-55; and Buzin, A. I.; Sautter, E.; Godovsky, Y. K.; Makarova, N. N.; Techhold, W. Colloid. Polym. Sci. 1998, 276, 1078-1087, and liquid crystalline properties, see for example, Godovskii, Y. K.; Makarova, N. N.; Kuz'min, N. N. Makromolekulare Chemie, Macromolecular Symposia 1989, 26, 91-109; and Makarova, N. N.; Godovskii, Y. K.; Lavrukhin, B. D. Vysokomolekulyarnye Soedineniya, Seriya A i Seriya B 1995, 37, 375-393.

There is an absence of literature on generally-linear arrangements of cyclosiloxane rings as part of polyorganosiloxane networks, and the unique properties resulting from the incorporation of the siloxane ring in the backbone of said network. Accordingly, there is a need in the art for a functionalized cyclosiloxane and a method for producing a functionalized cyclosiloxane. There is a further need in the art for a polyorganosiloxane network including a cyclosiloxane compound and a method for synthesizing the polyorganosiloxane network. The polyorganosiloxane network should include a generally-linear arrangement of cyclic organosiloxane compounds, and be synthesized by a low-cost and simplistic method.

SUMMARY OF THE INVENTION

The present invention is directed to syntheses of cyclolinear networks. Two novel cyclic siloxanes were used as starting materials. The cyclic siloxanes are self-condensed and co-condensed with silanol-terminated polydimethylsiloxane to vinyl-terminated cyclolinear polymers. Cyclolinear networks can be synthesized by hydrosilylation of vinyl-terminated cyclolinear polyorganosiloxanes with a copolymer of dimethylsiloxane and methylhydrosiloxane.

It is an objective of the invention to produce a cyclosiloxane and a method for creating the polyorganocyclosiloxane. It is a further object of the present invention to provide a polyorganocyclosiloxane that includes a generally-linear arrangement of cyclosiloxanes.

The present invention achieves these and other objectives by providing, in accordance with one aspect, a cyclosiloxane having the formula:

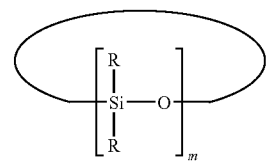

wherein m represents a number of repeating units and is an integer greater than or equal to 3, at least one R of at least one of the polymer's repeating units is a carboxylate, and each remaining R is independently selected from the group consisting of H and a $C_1$-$C_{30}$ alkyl group.

In accordance with another aspect, the present invention provides a polyorganocyclosiloxane having the formula:

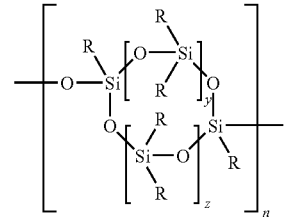

wherein n represents a number of repeating units and is an integer that is greater than or equal to 1, y represents a number of repeating units and is an integer that is greater than or equal to 1, z represents a number of repeating units and is an integer that is greater than or equal to 0 (in the instance when z is equal to 0, the O atom and the Si atom to the left and right of the z repeating unit in the formula above are directly bonded to one another), and each R is independently selected from the group consisting of H and a $C_1$-$C_{30}$ alkyl group.

In accordance with another aspect, the present invention also provides a polyorganocyclosiloxane polymer having the formula:

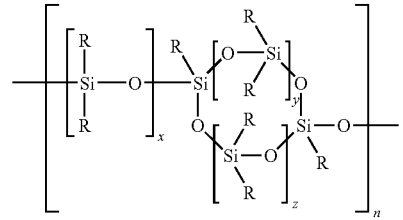

wherein n is an integer greater than or equal to 1, y represents a number of repeating units and is an integer that is greater than or equal to 1, z represents a number of repeating units and is an integer that is greater than or equal to 0, x represents a number of repeating units and is an integer that is at least 1 and less than or equal to 1000, and each R is independently selected from the group consisting of H and a $C_1$-$C_{30}$ alkyl group.

In accordance with yet another aspect, the present invention also provides a method of forming a cyclosiloxane, the method comprising the steps of providing a cyclic multi-siloxane having at least three repeating siloxane units, and functionalizing one or more Si atoms of the multi-siloxane with a functional group that includes a carboxylate group.

In accordance with yet another aspect, the present invention also provides a method of forming a polyorganocyclosiloxane network, the method comprising the steps of providing a cyclic multi-siloxane having at least three repeating siloxane units, functionalizing one or more Si atoms of the multi-siloxane with a functional group that includes a carboxylate group, and performing condensation of the functionalized multi-siloxane.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
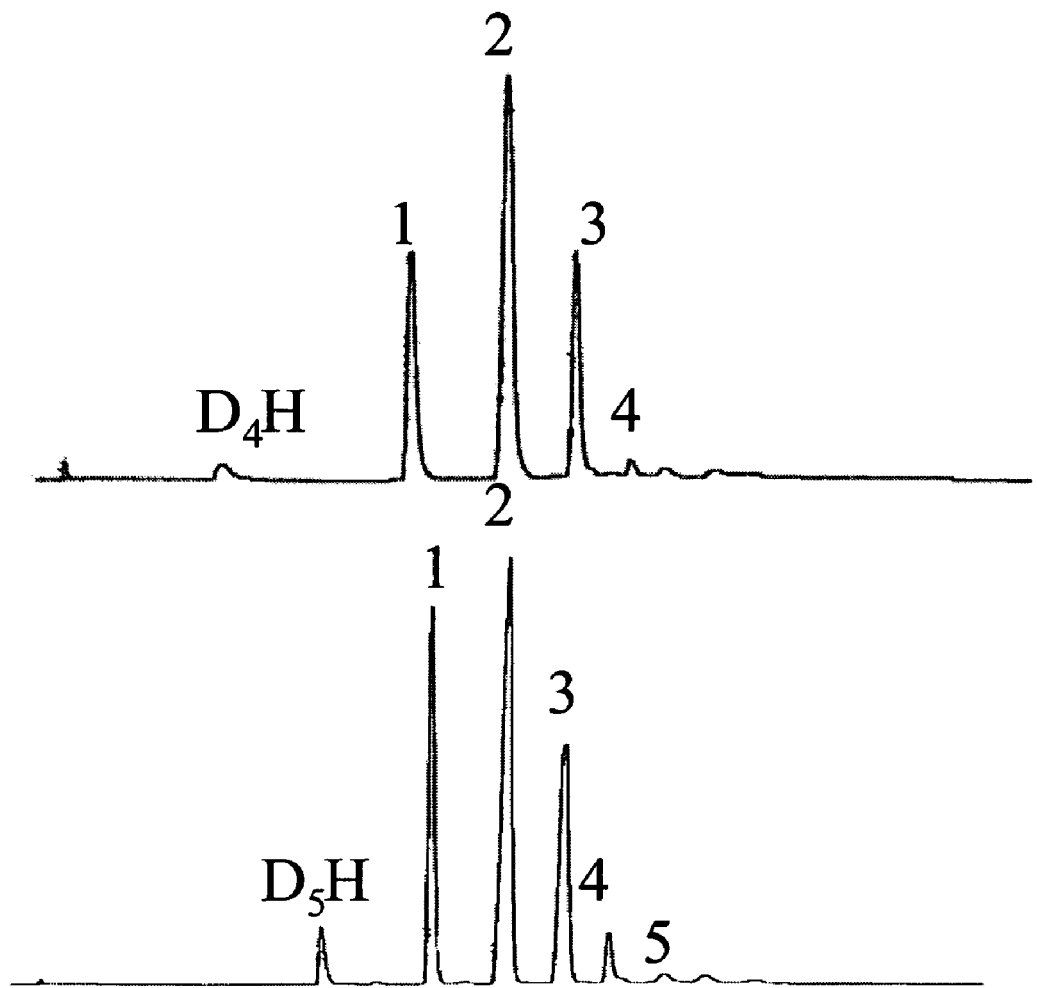
FIG. 1 shows GC traces of $D_4$ and $D_5$ mixtures after acetylation.

Certain terminology is used herein for convenience only and is not to be taken as a limitation on the present invention.

The present invention includes a cyclosiloxane having the formula:

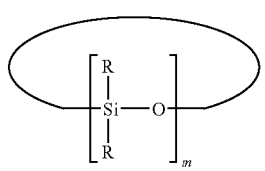

(i)

when used in conjunction with the above formula, the letter "m" represents a number of repeating units and is an integer greater than or equal to 3. Although m can be any positive integer value greater than or equal to 3, in one embodiment the present invention includes m values of 4 and 5.

At least one R of at least one of the polymer's repeating units is a carboxylate, and each remaining R is independently selected from the group consisting of H and a $C_1$-$C_{30}$ alkyl group. Alternate embodiments of the present invention include cyclosiloxanes wherein at least one R of a plurality of repeating units is a carboxylate, and wherein at least one R of at least three repeating units is a carboxylate. The R groups can be the same for each of the m repeating units, or they can be independently selected for each repeating unit.

Non-limiting examples of preferred carboxylates include methyl, ethyl, propyl, butyl and phenyl. In general, however, carboxylates are of the formula:

(ii)

wherein $R_1$ can be selected from the group consisting of H and a $C_1$-$C_{30}$ alkyl group. Non-limiting examples of R and $R_1$ include methyl, ethyl, propyl, butyl and phenyl groups, including all isomers.

The cyclosiloxane of the present invention can form a portion of a polyorganocyclosiloxane having the formula:

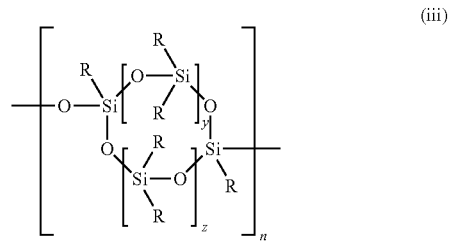

(iii)

As used in conjunction with this formula, n represents a number of repeating units and is an integer that is greater than or equal to 1, y represents a number of repeating units and is an integer that is greater than or equal to 1, and z represents a number of repeating units and is an integer that is greater than or equal to 0.

The polyorganocyclosiloxane is a generally-linear arrangement of cyclosiloxanes, said arrangement being referred to herein as a cyclolinear arrangement. Each R can be independently selected from the group consisting of H and a $C_1$-$C_{30}$ alkyl group. Similar to the cyclosiloxane discussed above, examples of preferred R groups include methyl, ethyl, propyl, butyl and phenyl groups, along with any isomers of the alkyl groups. According to another embodiment, at least one R of each of the y and z repeating units is an ethyl group.

Another embodiment of the polyorganocyclosiloxane according to the present invention has the formula:

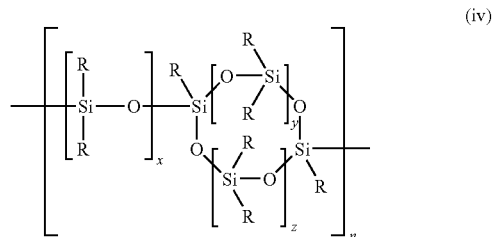

(iv)

wherein, again, n is an integer greater than or equal to 1, y represents a number of repeating units and is an integer that is greater than or equal to 1, x represents a number of repeating units and is an integer that is at least 1 and less than or equal to 1000, and z represents a number of repeating units and is an integer that is greater than or equal to 0.

The polyorganocyclosiloxane (iv) is also a cyclolinear arrangement that includes the cyclosiloxane of the present invention. Each R can be independently selected from the group consisting of H and a $C_1$-$C_{30}$ alkyl group. Just as before, examples of preferred R groups include methyl, ethyl, propyl, butyl and phenyl groups, along with any isomers of the alkyl groups. Alternate embodiments include at least one R of each of the y and z repeating units that is an ethyl group, and x values of 2, 7 and 8.

The cyclosiloxane of the present invention can be prepared by providing a cyclic multi-siloxane having at least three repeating siloxane units, and functionalizing one or more Si atoms of the multi-siloxane with a carboxylate functional group having the formula:

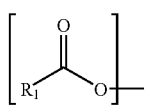

A moiety can be provided to the remaining Si atoms, if desired. An illustrative scheme for producing a preferred embodiment of the present invention is shown in reaction (v).

(v)

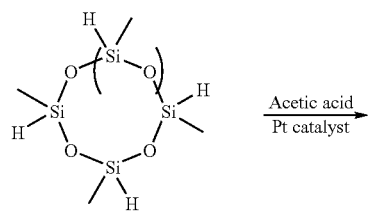 Acetic acid / Pt catalyst

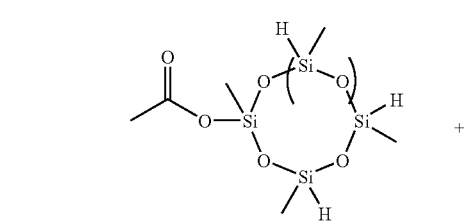 +

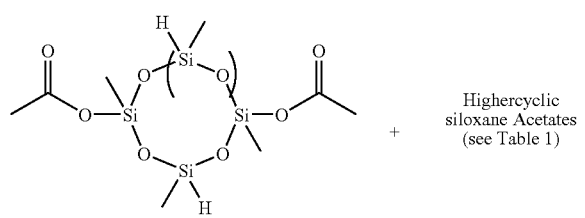 + Highercyclic siloxane Acetates (see Table 1)

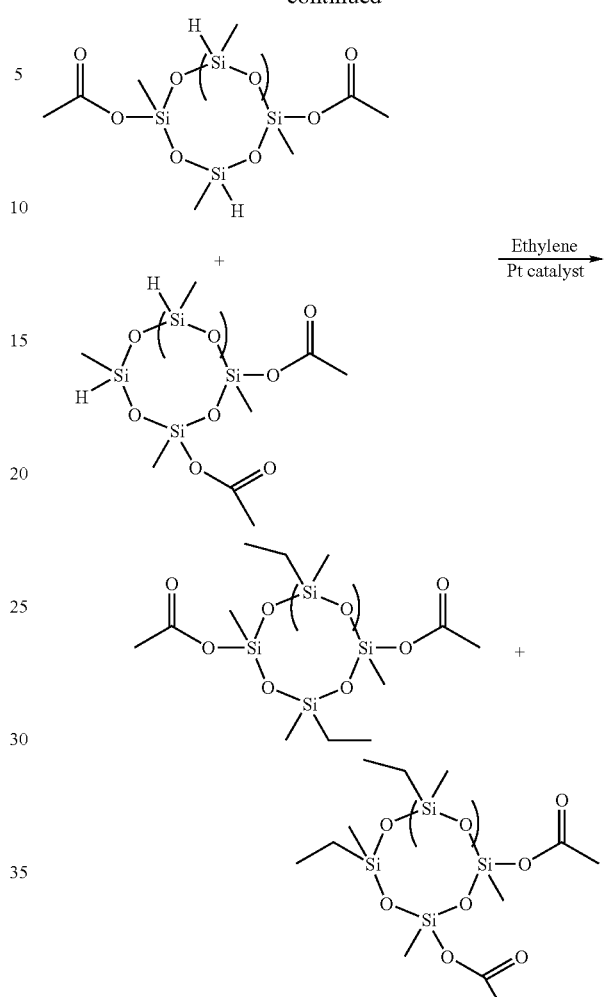

Reaction (v) shows a scheme for the formation of diacetoxydiethyltetramethylcyclotetrasiloxane ("$D_4Et_2OAc_2$"), wherein said scheme can also be employed to produce diacetoxytriethylpentamethylcyclopentasiloxane ("$D_5Et_3OAc_2$"). For the production of $D_5Et_3OAc_2$, however, the number of units in parentheses is two instead of one.

Non-limiting examples of suitable cyclic multi-siloxane starting materials include tetramethylcyclotetrasiloxane ("$D_4H$") and pentamethylcyclopentasiloxane ("$D_5H$"), which have the following respective formulae:

(vi)

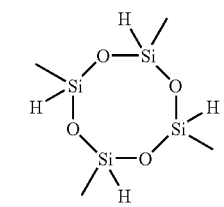

$D_4H$

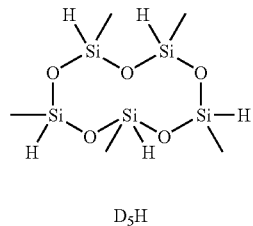

D₅H

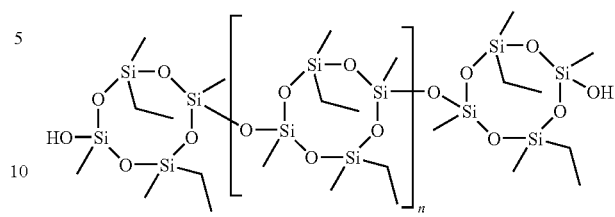

Functionalizing the cyclic multi-siloxane can be performed via any known mechanism that will replace a moiety provided to a Si atom of the cyclic multi-siloxane with a carboxylate functional group. An example of a suitable mechanism to functionalize the cyclic multi-siloxane is acetylation of the cyclic multi-siloxane by introducing acetic acid to the cyclic multi-siloxane in the presence of a catalyst. Alternate embodiments of the method call for the introduction of compounds other than acetic acid, depending upon the desired functional group to be provided to the cyclic multi-siloxane.

The step of forming a desired moiety at the Si atoms that are not functionalized is performed by introducing a suitable compound to the cyclic multi-siloxane in the presence of a catalyst. The suitable compound can be selected, for example, as a compound having a derivative that forms the desired moiety. For example, to bond an ethyl moiety to an un-functionalized Si atom, ethylene can be introduced to the cyclic mufti-siloxane in the presence of a Pt catalyst.

The present invention also includes a method for reacting the cyclosiloxane to form a portion of a generally-linear polyorganocyclosiloxane having the formula:

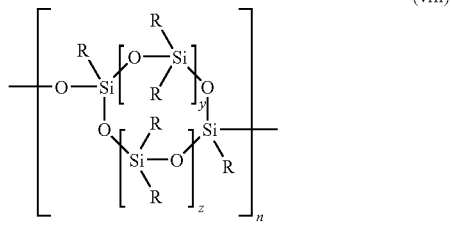

wherein n represents a number of repeating units and is an integer that is greater than or equal to 1, y represents a number of repeating units and is an integer that is greater than or equal to 1, and z represents a number of repeating units and is an integer that is greater than or equal to 0. Each R is independently selected from the group consisting of H and a $C_1$-$C_{30}$ alkyl group.

Figure 3:
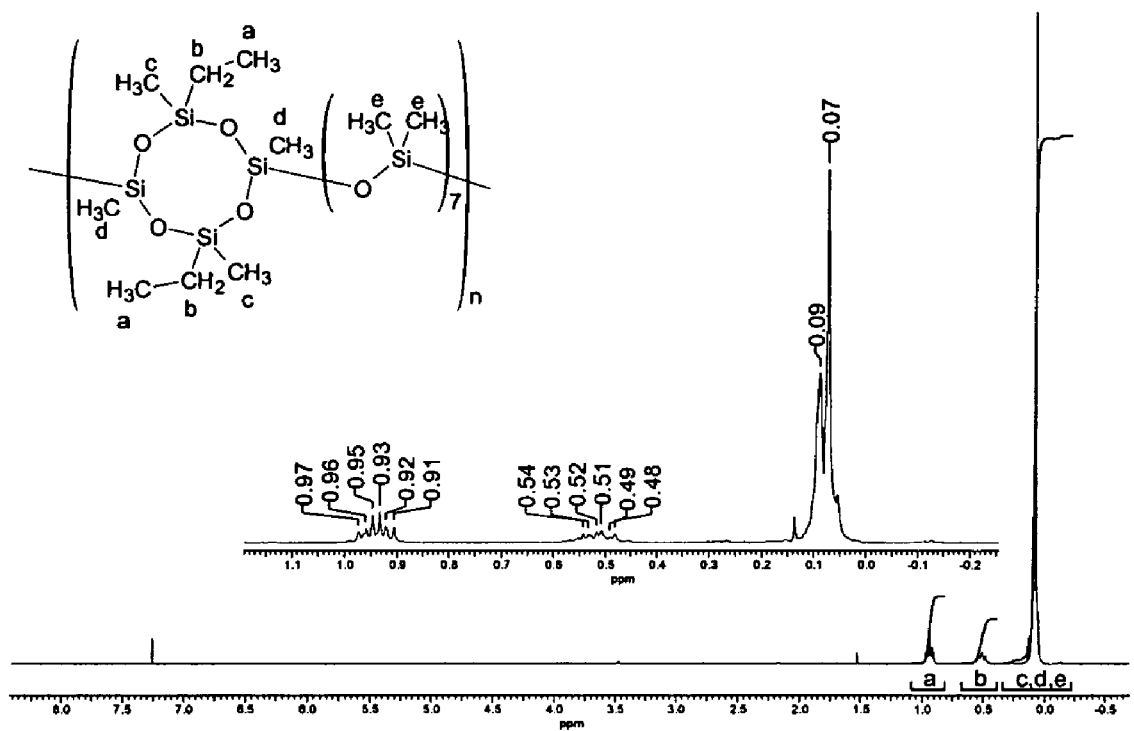
FIG. 3 is a $^1$H-NMR spectrum of $D_4Et_2OAc_2$ co-condensed with silanol-terminated PDMS.

One possible reaction scheme to form the polyorganocyclosiloxane (viii) shown generally above is the self reaction (xiv). The self condensation scheme of reaction (xiv) occurs in the presence of water and an excess of pyridine, resulting in the formation of a polyorganocylcosiloxane having the formula:

For the polyorganocyclosiloxane produced according to the scheme shown in FIG. 3, the values of y and z are both 1, but as explained above, y can be any integer that is greater than or equal to 1, and z can be an integer that is greater than or equal to 0. Isomers of the polyorganocylcosiloxane (viii) and other formulas disclosed herein are also within the scope of the present invention.

Another embodiment of the present invention includes a polyorganocyclosiloxane polymer having the formula:

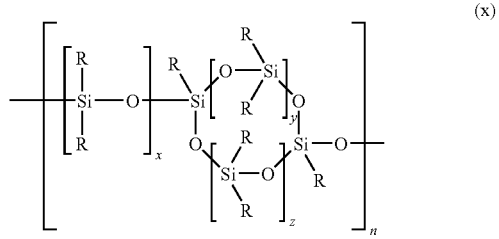

wherein n is an integer greater than or equal to 1, y represents a number of repeating units and is an integer that is greater than or equal to 1, x represents a number of repeating units and is an integer that is at least 1 and less than or equal to 1000, and z represents a number of repeating units and is an integer that is greater than or equal to 0. Each R is independently selected from the group consisting of H and a $C_1$-$C_{30}$ alkyl group. Preferred embodiments of the present invention include the polysiloxane network (x) wherein at least one R of each of the y and z repeating units is an ethyl group.

One method of forming the polyorganocyclosiloxane (x) includes the steps of providing a cyclic multi-siloxane having at least three repeating siloxane units, and functionalizing one or more Si atoms of the multi-siloxane with a carboxylate functional group having the formula:

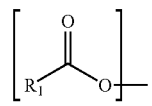

where $R_1$ is H or a $C_1$-$C_{30}$ alkyl group. For example, the functionalizing step can be accomplished by acetylation, where $R_1$ is a methyl group. The method optionally includes the step of forming a desired moiety, such as an ethyl group at the remaining Si atoms. Co-condensing the functionalized multi-siloxane with a silanol-terminated polydialkylsiloxane results in the polyorganocyclosiloxane (x).

An illustrative scheme for said co-condensation is shown in reaction (xi):

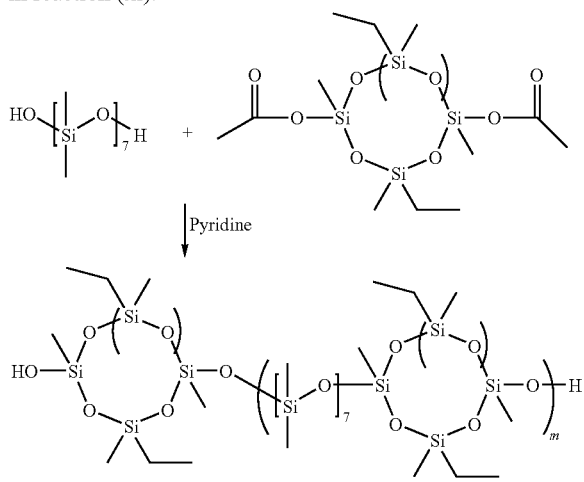

(xi)

The scheme shows $D_4Et_2OAc_2$ co-condensation with silanol-terminated PDMS (the structure shown is for $D_4Et_2OAc_2$ co-condensation; for $D_5Et_3OAc_2$ co-condensation the number of units in parentheses is two; for convenience only one isomer is shown).

According to the scheme of (x), the difunctionalized di-functionalized cyclic siloxane diacetoxydiethyltetramethyl-cyclotetrasiloxane ("$D_4Et_{20}Ac_2$") is co-condensed with silanol-terminated polydimethylsiloxane ("PDMS") to produce a polyorganocyclosiloxane having the formula:

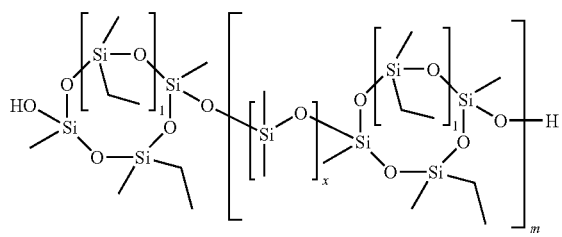

(xii)

Other embodiments can include cyclic multi-siloxane rings comprising any number of Si atoms. For instance, employing the scheme shown in FIG. 4 for the co-condensation of the di-functionalized compound diacetoxytriethylpentamethyl-cyclopentasiloxane ("$D_5Et_3OAc_2$"), which includes a ring having five Si atoms, with silanol-terminated PDMS results in the polysiloxane compound having the formula:

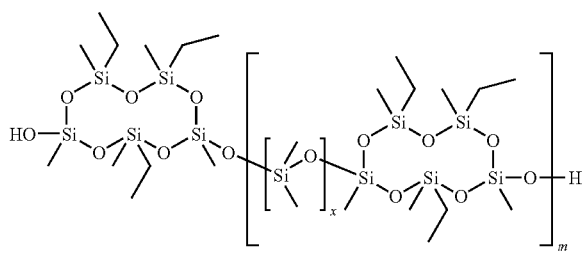

(xii)

Example

Reagents. Tetramethylcyclotetrasiloxane (>95%) ($D_4H$), pentamethyl-cyclopentasiloxane (>95%) ($D_5H$), silanol-terminated polydimethylsiloxane (PDMS) (average formula $HO[Si(CH_3)_2O]_7H$), and platinum divinyltetramethyldisi-loxane complex (Pt(dvs), 2.1-2.4% Pt in xylene) were purchased from Gelest. Low molecular weight impurities were removed from $D_5H$ by vacuum distillation, while the other chemicals were used without further purification. Acetic acid, pyridine, ethylene and chlorodimethylvinylsiloxane (CD-MVS) were purchased from Aldrich and used without further purification.

Characterization. $M_n$ and $M_w$ were determined by GPC (Waters Instruments) using a laser light scattering detector (LLS) (MiniDawn, Wyatt Technology). $^1H$-NMR spectrometry was carried out by a 300 MHz spectrometer, in $CDCl_3$. A GC-8A Gas Chromatograph (Shimadzu Instruments) was used. ATR/FTIR-spectroscopy was carried out with a FTIR-8300 (Shimadzu Instruments) equipped with an ATR module (MIRacle, Pike Technologies). The cyclosiloxanes were separated by a spinning band annular still (Perkin Elmer EFT-51).

Synthesis of diacetoxydiethyltetramethyl-cyclotetrasiloxane ($D_4Et_2OAc_2$). $D_4H$ was reacted with acetic acid in the presence of Pt(dvs). The onset of the reaction and its progress was indicated by $H_2$ evolution. When the evolution of $H_2$ slowed, more Pt(dvs) solution was added. The d iacetoxytetramethylcyciotetrasiloxane ($D_4H_2OAc_2$) was separated from the other cyclics by distillation using an annular still, purity >96%.

Ethylation of $D_4H_2OAc_2$ was carried out in a round bottom flask equipped with an addition funnel, ethylene inlet, and bubbler outlet. The $D_4H_2OAc_2$ was added dropwise to Pt(dvs) under a blanket of ethylene. The activity of the Pt(dvs) was evaluated every five minutes by turning off the ethylene inlet and observing the vacuum created due to the continued ethylene consumption. After $D_4H_2OAc_2$ addition, a further aliquot of Pt(dvs) was added to ensure complete ethylation. The $D_4Et_2OAc_2$ was distilled off of the Pt(dvs). According to GC, the purity of the product was >98%. The structure of $D_4Et_2OAc_2$ was confirmed by $^1H$-NMR spectroscopy.

Synthesis of diacetoxytriethylpentamethyl-cyclopentasiloxane ($D_5Et_3OAc_2$). The synthesis of $D_5Et_3OAc_2$ was carried out by the same procedure discussed above for $D_4Et_2OAc_2$. After acetylation and distillation off of Karstedt's catalyst, the diacetoxypentamethylcyclopen-tasiloxane ($D_5H_3OAc_2$) was isolated by distillation using an annular still (53° C., 0.070 mmHg). $D_5H_3OAc_2$ was ethylated to $D_5Et_3OAc_2$ and was distilled off of Karstedt's catalyst. According to GC, the purity of the product was >98%. The structure of $D_5Et_3OAc_2$ was confirmed by $^1H$-NMR spectroscopy.

Self-condensation of $D_4Et_2OAc_2$ to dimethylvinylsilane ditelechelic poly(diethyltetramethylcyclotetrasiloxane) (V-PD4Et2-V). A typical procedure for the preparation of cyclolinear polymers by self-condensation of $D_4Et_2OAc_2$ was as follows: In a 50 mL round bottom flask, 25.0 g (0.0607 moles) $D_4Et_2OAc_2$ were reacted with 1.10 g (0.0613 mole) water in the presence of 17.4 g (0.134 mole) diisopropylethy-lamine for 18 hours at 70° C. FIG. 1 outlines the self-condensation. Progress of the polymerization was followed by GPC.

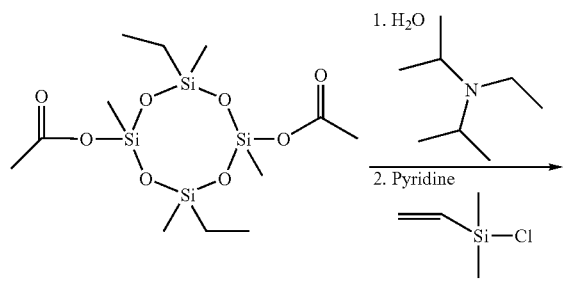

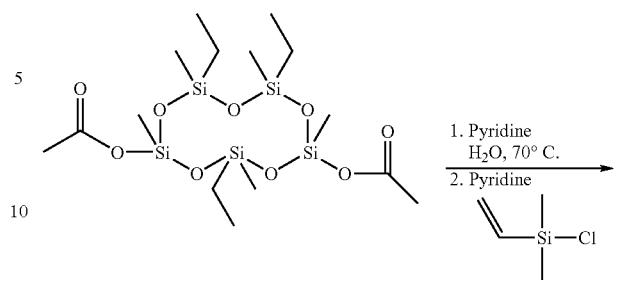

The steps involve self-Condensation of $D_4Et_2OAc_2$ to $HO\text{-}D_4Et_2\text{-}OH$ followed functionalization with CDMVS to $V\text{-}PD_4Et_2\text{-}V$ End functionalization was carried out by adding to the charge 30 mL dichloromethane, 22.7 g (0.188 mole) CDMVS, and 15.6 g (0.198 mole) pyridine. The solution was stirred under a blanket of argon for 12 hours at room temperature, then a reflux column was added, the charge was heated for 4 hours to 50° C., cooled to room temperature, and the unreacted ingredients were removed by distillation.

Figure 2:
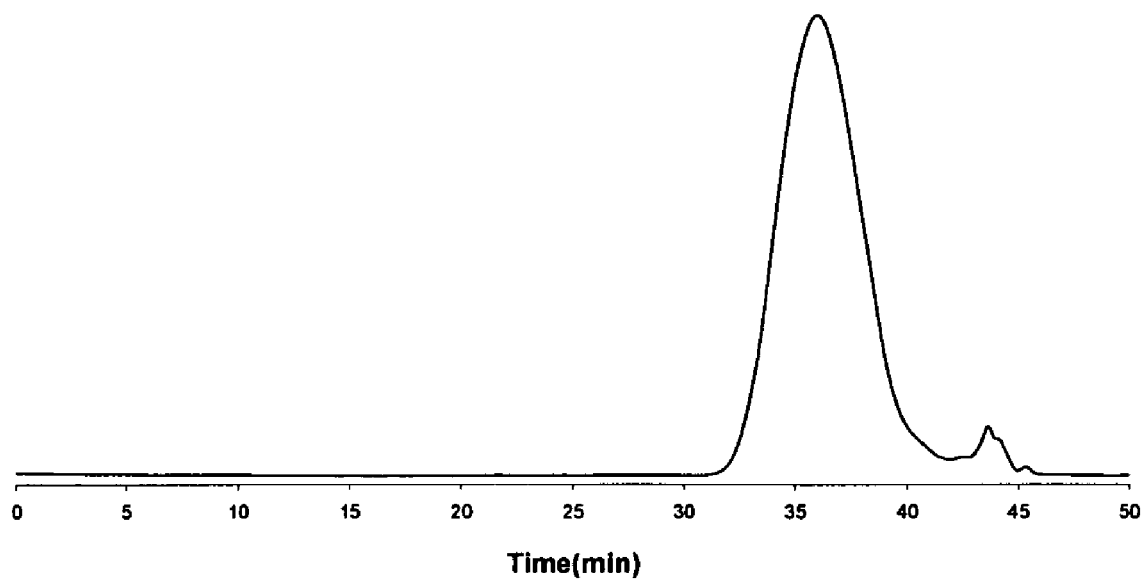
FIG. 2 is a representative GPC trace of $D_4Et_2OAc_2$ co-condensed with silanol-terminated PDMS (Mw=17,100 g/mole by LLS, after extraction with methanol)

To remove salts, the charge was dissolved in n-pentane and washed with 20 mL water four times. To remove low molecular weight cyclized material, the n-pentane was evaporated, the polymer was precipitated three times into MeOH, the polymer was dissolved in n-pentane, dried over $MgSO_4$, filtered, and the solvent was evaporated with a rotary evaporator. The yield was 14.7 g (78%) of dimethylvinylsilane ditelechelic poly(diethyltetramethylcyclotetrasiloxane) (V-PD4Et2-V): $M_n$=12,900 g/mole by $^1$H-NMR analysis. FIG. 2 shows the spectrum and assignments. $M_n$ was determined by calculating the ratio of integrals of the vinyl protons in reference to the ethyl protons, and assuming that all polymers were di-vinyl telechelic.

Self-condensation of $D_5Et_3OAc_2$ to dimethylvinylsilane ditelechelic poly(triethylpentamethylcyclopentasiloxane) ($V\text{-}PD_5Et_3\text{-}V$). In a 100 mL round bottom flask, 25.0 g (0.050 mole) $D_5Et_3OAc_2$ were reacted with 0.900 g (0.0505 mole) water in the presence of 8.70 g (0.110 mole) pyridine for 48 hours at 70° C. FIG. 3 shows the transformations effected. The polymer was reacted with 24.0 g (0.199 mole) CDMVS in the presence of 16.5 g pyridine (0.209 mole) as described above. The mixture was washed with water and precipitated three times into MeOH. The yield was 11.0 g (56%) of $V\text{-}PD_5Et_3\text{-}V$. Mn was 8,000 g/mole by $^1$H-NMR analysis of the vinyl end-groups.

Figure 4:
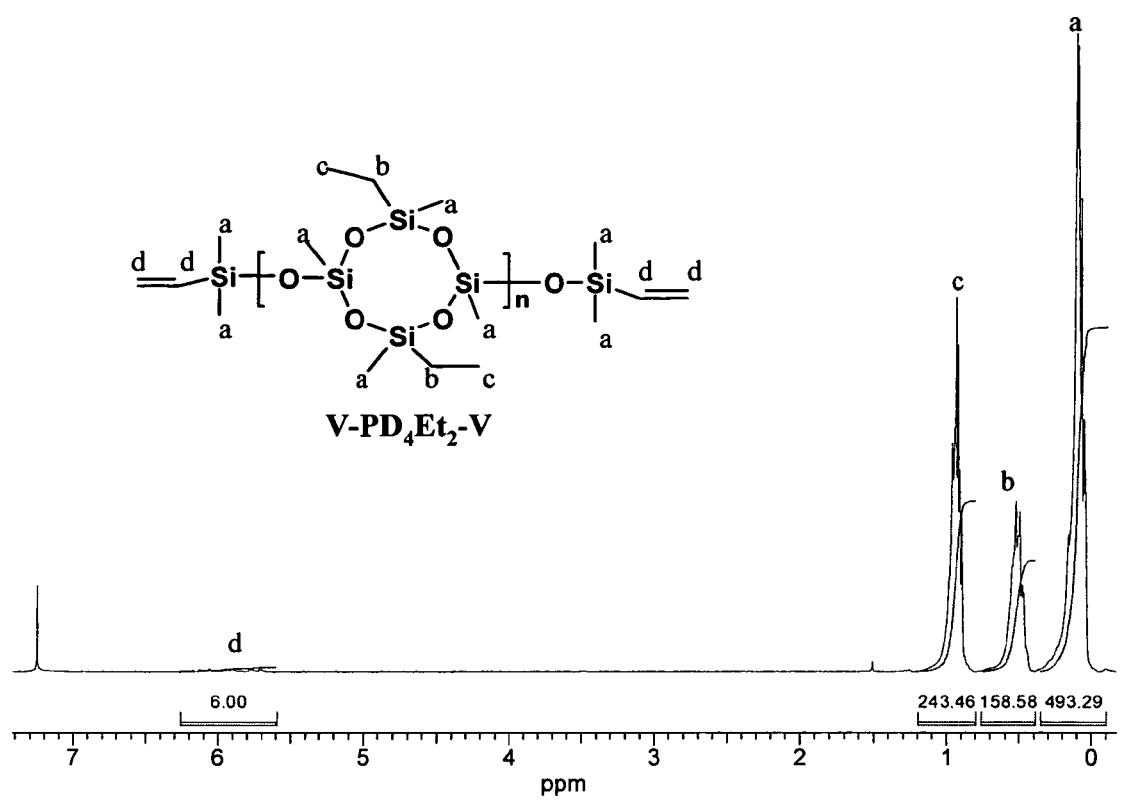
FIG. 4 is a 1H-NMR spectrum of V-PD4Et2-V, together with resonance assignments.
Figure 5:
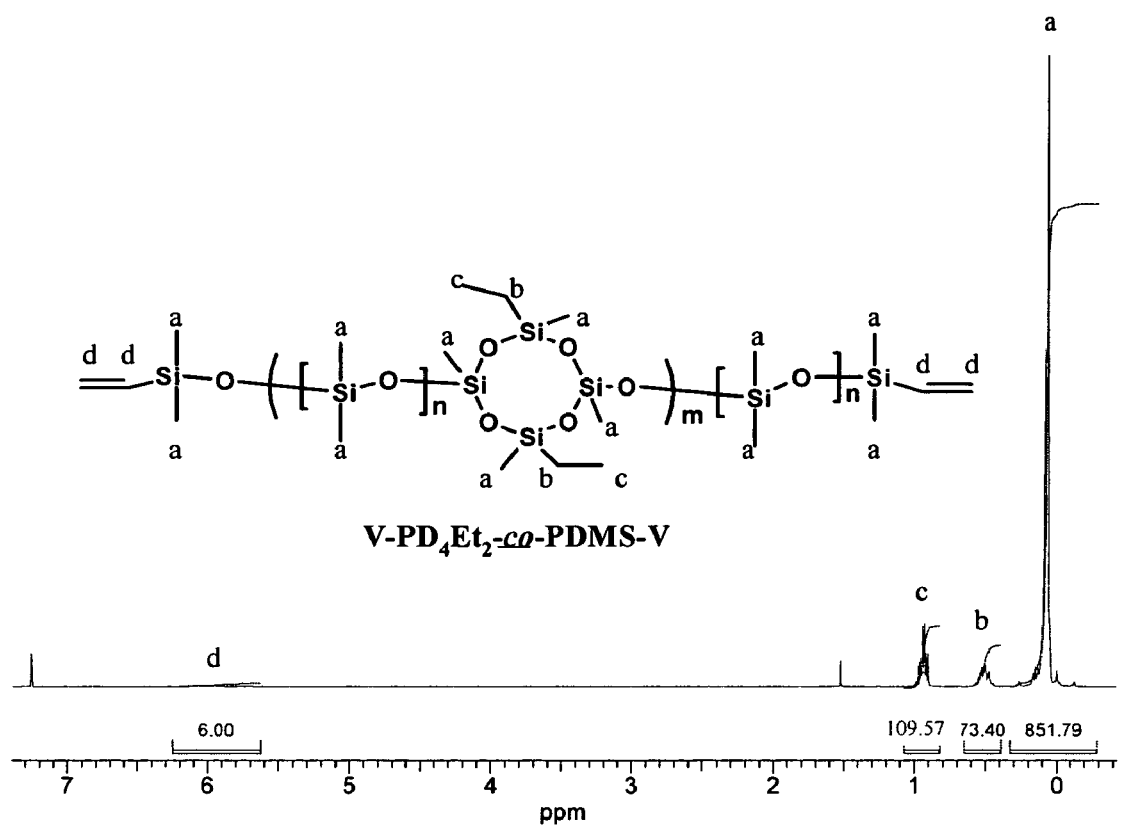
FIG. 5 is a 1H-NMR spectrum of V-PD4Et2-co-PDMS-V, together with resonance assignments.

Self-Condensation of $D_5Et_3OAc_2$ to $HO\text{-}PD_5Et_3\text{-}OH$ is followed by functionalization with CDMVS to $V\text{-}PD_5Et_3\text{-}V$ occurs as follows:

Co-Condensation of $D_4Et_2OAc_2$ with silanol-terminated PDMS to dimethylvinylsilane ditelechelic poly(diethyltetramethylcyclotetrasiloxane-co-polydimethylsiloxane) ($V\text{-}PD_4Et_2\text{-co-PDMS-V}$). In a 50 mL round bottom flask, 15.0 g (0.0364 mole) $D_4Et_2OAc_2$ were reacted with 20.4 g (~0.0371 mole) silanol-terminated PDMS (~550 g/mole) at 70° C. for 18 hours in the presence of 8.85 g (0.066 mole) diisopropylethylamine. FIG. 4 depicts the transformation effected. Progress of the reaction was monitored by GPC. The polymer was functionalized with 37.8 g (0.313 mole) CDMVS in the presence of 26.0 g (0.328 mole) pyridine. To remove salt and unreacted cyclized material, the mixture was dissolved in n-pentane, washed with water, and precipitated three times into MeOH. Yield=9.5 g (62%) of $V\text{-}PD_4Et_2\text{-co-PDMS-V}$. $M_n$=13,600 g/mole by $^1$H-NMR analysis of the vinyl end groups. FIG. 5 shows the spectrum and assignments.

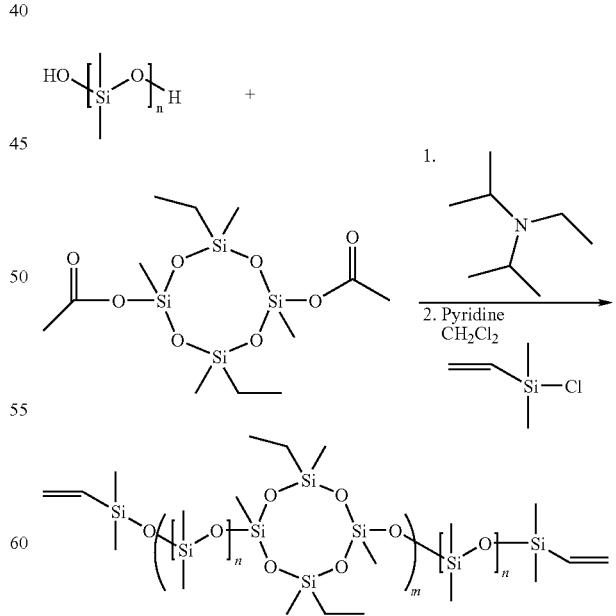

Co-Condensation of $D_5Et_3OAc_2$ with silanol-terminated PDMS to dimethylvinylsilane ditelechelic poly(triethylpentamethylcyclopentasiloxane-co-polydimethylsiloxane)

(V-PD₅Et₃-co-PDMS-V). In a 100 mL round bottom flask, 15.0 g (0.030 mole) $D_5Et_3OAc_2$ was reacted with 17.3 g (~0.0314 mole) silanol-terminated PDMS in the presence of 8.85 g (0.066 mole) diisopropylethylamine at 70° C. After 66 hours, the polymer was functionalized as described above with 34.75 g (0.288 mole) CDMVS in 30 mL dichloromethane in the presence of 23.9 g (0.302 mole) pyridine. The polymer was purified by washing with water and precipitation into MeOH. The yield was 53% or 13.1 g V-PD₅Et₃-co-PDMS-V.

Network Formation by Hydrosilation. Vinyl terminated cyclolinear polymers were hydrosilated by PDMS-co-PMHS in the presence of platinum carbonyl cyclovinylmethylsiloxane complex (20 ppm) in FIG. 6. The masses of vinyl-terminated cyclolinear polymers and the Si—H to Vinyl ratio=2 were held constant, while the mass of PDMS-co-PMHS crosslinker was varied.

A typical crosslinking of V-PD₄Et₂-co-PDMS-V was carried out as follows: 4 grams (0.000294 moles) of V-PD₄Et₂-co-PDMS-V (13,600 g/mol) and 0.343 g (0.000229 moles) of PDMS-co-PMHS in 1 mL toluene were thoroughly mixed with a Thermolyne rotomixer. Subsequently, 0.0040 g (30 ppm Pt complex) of Pt carbonyl catalyst solution was added, the charge was mixed with the rotomixer, and poured into a mold. To remove the toluene, the system was placed in an area with good ventilation for ~30 minutes and cured in an oven at 75° C. After 12 hours, the network was carefully removed from the mold.

The other cyclolinear networks were prepared by the same procedure described for V-PD₄Et₂-co-PDMS-V based networks with a Si—H to Vinyl ratio=2 for every system.

Figure 6:
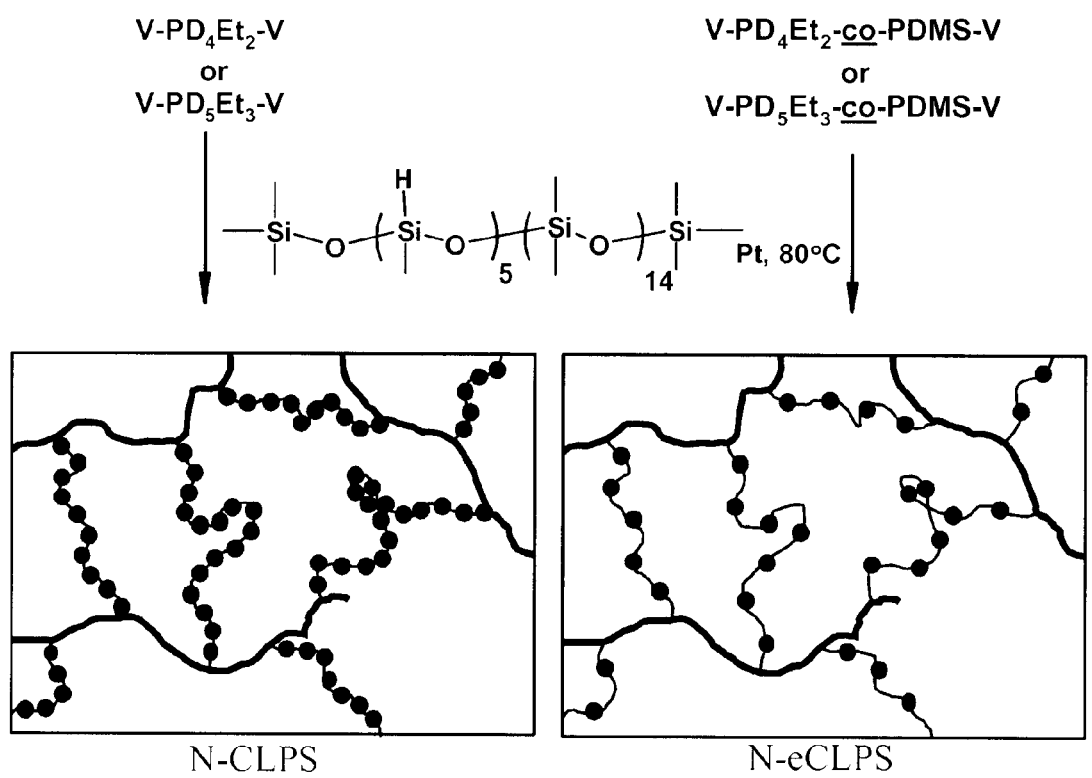
FIG. 6 is a view of the structures of the networks obtained by crosslinking vinyl-terminated cyclolinear polymers with PDMS-co-PMHS.

As shown in FIG. 6, the idealized structures of the networks obtained by crosslinking of vinyl-terminated cyclolinear polymers with PDMS-co-PMHS are shown. The dots indicate cyclosiloxane units, the thick lines indicate the crosslinker, and the thin lines indicate the PDMS segment (in N-eCLPS).

TABLE 1

Products and their relative concentrations (by GC) obtained in the synthesis of $D_4H_2OAc_2$ and $D_5H_3OAc_2$.

| No. of acetate groups | D₄ mixture | D₅ mixture |
|---|---|---|
| Unreacted starting material | (structure) 3% | (structure) 4% |
| 1 | (structure) 22% | (structure) 21% |

TABLE 1-continued

Products and their relative concentrations (by GC) obtained in the synthesis of $D_4H_2OAc_2$ and $D_5H_3OAc_2$.

| No. of acetate groups | $D_4$ mixture | $D_5$ mixture |
|---|---|---|
| 2 | [structure] 46% | [structure] 40% |
| 3 | [structure] 20% | [structure] 23% |
| 4 | [structure] 2% | [structure] 5% |

TABLE 1-continued

Products and their relative concentrations (by GC) obtained in the synthesis of $D_4H_2OAc_2$ and $D_5H_3OAc_2$.

| No. of acetate groups | $D_4$ mixture | $D_5$ mixture |
|---|---|---|
| 5 | | 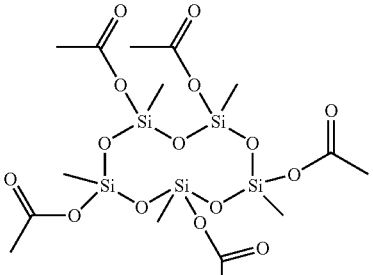 2% |

Self-condensation of $D_4Et_2OAc_2$ or $D_5Et_3OAc_2$: Reaction (xiv) helps to visualize the cyclolinear polymer obtained by self-condensation of $D_4Et_2OAc_2$.

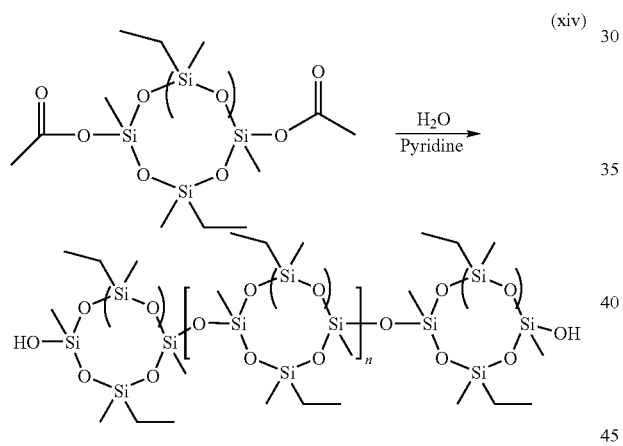

(xiv)

The scheme is for self-condensation (the structure shown is for $D_4Et_2OAc_2$ self-condensation; for $D_5Et_3OAc_2$ self-condensation the number of units in parentheses is two; for convenience only one isomer is shown). Self-condensation of $D_4Et_2OAc_2$ also produced a dimer; while the self-condensation of $D_5Et_3OAc_2$ produces dimers together with a bicyclic byproduct via an intramolecular condensation. These low molecular weight byproducts were removed by extraction with methanol.

Co-condensation of $D_4Et_2OAc_2$ or $D_5Et_3OAc_2$ with silanol-terminated PDMS: To reduce undesirable dimerization and the formation of bicyclic byproducts, $D_4Et_2OAc_2$ (and $D_5Et_3OAc_2$) were co-condensed with silanol-terminated PDMS. Reaction (x) shows the scheme of co-condensation. Depending on reagent stoichiometry, the end groups of the products can be controlled. Low molecular weight unreacted cyclosiloxanes were removed by extraction with methanol. FIG. 2 shows a representative GPC trace of co-condensed $D_4Et_2OAc_2$ with silanol. A representative GPC trace of $D_4Et_2OAc_2$ co-condensed with silanol-terminated PDMS ($M_w$=17,100 g/mole by LLS, after extraction with methanol).

The relative extent of cyclic and linear siloxane moieties in the polymers was determined by $^1$H-NMR spectroscopy. FIG. 3 shows a representative spectrum, that is, $^1$H-NMR spectrum of $D_4Et_2OAc_2$ co-condensed with silanol-terminated PDMS, which indicates that the relative amount of the cyclic moieties can be quantitated by determining the amount of ethyl substituents in the cyclosiloxane relative to the methyl groups in the linear moieties.

From the above description of the invention, those skilled in the art will perceive improvements, changes and modifications. Such improvements, changes and modifications within the skill of the art are intended to be covered by the appended claims.

What is claimed is:

1. A cyclosiloxane having the formula:

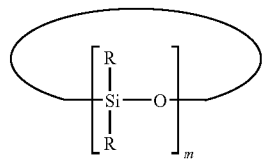

wherein m represents a number of repeating units and is an integer equal to 3 or an integer greater than or equal to 5, at least one R of at least one repeating unit is a carboxylate group, and each remaining R is independently selected from H or a $C_2$ to $C_{30}$ alkyl group.

2. The cyclosiloxane according to claim 1, wherein the carboxylate group is represented by the formula:

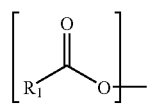

wherein $R_1$ is H or a $C_1$ through $C_{30}$ alkyl group.

3. The cyclosiloxane according to claim 1, wherein m is 5.

4. A polyorganocyclosiloxane having the formula:

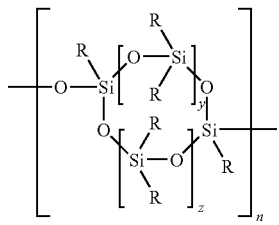

wherein n represents a number of repeating units and is an integer that is greater than or equal to 1, y represents a number of repeating units and is an integer that is greater than or equal to 1, z represents a number of repeating units and is an integer that is greater than or equal to 0, and each R is independently selected from H or a $C_2$ to $C_{30}$ alkyl group, with the proviso that the sum of the integers y and z is equal to 3 or greater than or equal to 5 or more.

5. The polyorganocyclosiloxane according to claim 4, wherein at least one R of each of the y and z repeating units is an ethyl group.

6. A polyorganocyclosiloxane having the formula:

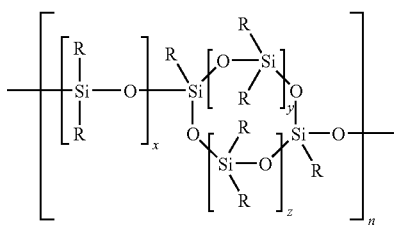

wherein n represents a number of repeating units and is an integer greater than or equal to 1, x represents a number of repeating units and is an integer that is at least 1 and less than or equal to 1000, y represents a number of repeating units and is an integer that is greater than or equal to 1, z represents a number of repeating units and is an integer that is greater than or equal to 0, and each R is independently selected from H or a $C_2$ to $C_{30}$ alkyl group, with the proviso that the sum of the integers y and z is equal to 3 or greater than or equal to 5 or more.

7. The polyorganocyclosiloxane according to claim 6, wherein at least one R of each of the y and z repeating units is an ethyl group.

8. A method of forming a cyclosiloxane, the method comprising the steps of:

providing a cyclic multi-siloxane having at least three repeating siloxane units where the cyclic multi-siloxane has the formula:

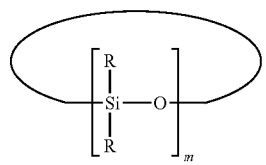

wherein each R is independently selected from H or a $C_2$ to $C_{30}$ alkyl group with the proviso that at least one R of any one of the $R_5$ is a H, and m represents a number of repeating units and is an integer that is equal to 3 or an integer that is greater than or equal to 5; and functionalizing one or more Si atoms of the multi-siloxane with a carboxylate functional group.

9. The method according to claim 8, further comprising the step of forming a desired moiety at the remaining Si atoms, wherein the desired moiety is selected from a $C_1$ to $C_{30}$ alkyl group.

10. The method according to claim 8, wherein the step of functionalizing one or more Si atoms includes the step of performing acetylation in the presence of a catalyst.

11. The method according to claim 8, wherein m is 5.

12. A method for forming a polyorganocyclosiloxane, the method comprising the steps of:

providing a cyclic multi-siloxane having at least three repeating siloxane units where the cyclic multi-siloxane has the formula:

wherein each R is independently selected from H or a $C_2$ to $C_{30}$ alkyl group, and m represents a number of repeating units and is an integer that is equal to 3 or an integer that is greater than or equal to 5;

functionalizing one or more Si atoms of the cyclic multi-siloxane with a carboxylate functional group; and performing condensation of the functionalized cyclic multi-siloxane.

13. The method according to claim 12, further comprising the step of forming a moiety at Si atoms other than the functionalized Si atom of the cyclic multi-siloxane.

14. The method according to claim 12, wherein m is 5.

15. The method according to claim 12, wherein the step of performing condensation comprises the step of self condensing the functionalized cyclic multi-siloxane to form a polyorganocyclosiloxane.

16. The method according to claim 12, wherein the step of performing condensation comprises the step of co-condensing the functionalized cyclic multi-siloxane with a silanol-terminated polydialkylsiloxane to form a polyorganocyclosiloxane.

17. The method according to claim 12, wherein the silanol-terminated polydialkylsiloxane is selected from the group consisting of polydimethylsiloxane, polydiethylsiloxane, and polymethylphenylsiloxane.

18. Polymers formed by the self-condensation of the polyorganocyclosiloxane of claim 4.

19. Polymers formed by the co-condensation of the polyorganocyclosiloxane of claim 4 with silanol-terminated polydimethylsiloxane.

20. A cyclosiloxane having the formula:

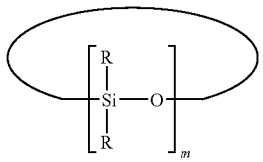

wherein m represents a number of repeating units and is an integer greater than or equal to 5, at least one R of at least one repeating unit is a carboxylate group, and each remaining R is independently selected from H or a $C_1$ to $C_{30}$ alkyl group.

21. The cyclosiloxane according to claim 20, wherein the carboxylate group is represented by the formula:

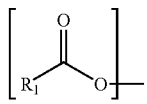

wherein $R_1$ is H or a $C_1$ to $C_{30}$ alkyl group.

22. A cyclosiloxane having the formula:

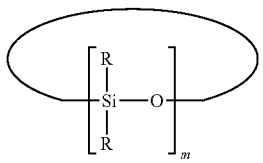

wherein m represents a number of repeating units and is an integer equal to 3 or an integer greater than or equal to 5, and R is independently selected from H, a $C_1$ to $C_{30}$ alkyl group or a carboxylate group, and wherein the cyclosiloxane has exactly two carboxylate groups, each of the two carboxylates being attached to a different Si atom in the cyclosiloxane.

23. The cyclosiloxane according to claim 22, wherein the carboxylate is represented by the formula:

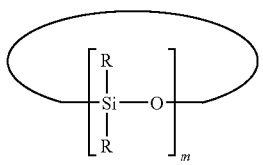

wherein $R_1$ is H or a $C_1$ to $C_{30}$ alkyl group.

24. The cyclosiloxane according to claim 22, wherein m is 5.

25. A polyorganocyclosiloxane having the formula:

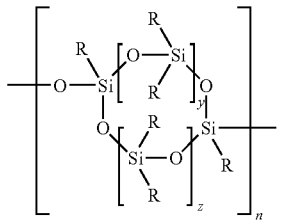

wherein n represents a number of repeating units and is an integer that is greater than or equal to 1, y represents a number of repeating units and is an integer that is greater than or equal to 1, z represents a number of repeating units and is an integer that is greater than or equal to 0, and each R is independently selected from H or a $C_1$ to $C_{30}$ alkyl group, and wherein the polyorganocyclosiloxane has vinyl termini at both ends of the molecule, with the proviso that the sum of the integers y and z is equal to 3 or greater than or equal to 5 or more.

26. The polyorganocyclosiloxane according to claim 25, wherein at least one R of each of the y and z repeating units is an ethyl group.

27. A polyorganocyclosiloxane having the formula:

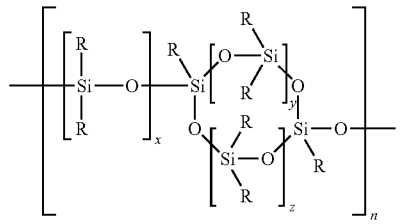

wherein n represents a number of repeating units and is an integer greater than or equal to 1, x represents a number of repeating units and is an integer that is at least 1 and less than or equal to 1000, y represents a number of repeating units and is an integer that is greater than or equal to 1, z represents a number of repeating units and is an integer that is greater than or equal to 0, and each R is independently selected from H or a $C_1$ to $C_{30}$ alkyl group, and wherein the polyorganocyclosiloxane has vinyl termini at both ends of the molecule, with the proviso that the sum of the integers y and z is equal to 3 or greater than or equal to 5 or more.

28. The polyorganocyclosiloxane according to claim 27, wherein at least one R of each of the y and z repeating units is an ethyl group.

29. A method of forming a cyclosiloxane, the method comprising the steps of:
providing a cyclic multi-siloxane having at least three repeating siloxane units where the cyclic multi-siloxane has the formula:

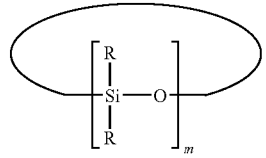

wherein each R is independently selected from H or a $C_1$ to $C_{30}$ alkyl group, and m represents a number of repeating units and is an integer that is equal to 3 or greater than or equal to 5; and functionalizing two Si atoms of the multi-siloxane with one carboxylate functional group each.

30. The method according to claim 29, further comprising the step of forming a desired moiety at the remaining Si atoms, wherein the desired moiety is selected from a $C_1$ to $C_{30}$ alkyl group.

31. The method according to claim 29, wherein the step of functionalizing one or more Si atoms includes the step of performing acetylation in the presence of a catalyst.

32. The method according to claim 29, wherein m is 5.

33. A method for forming a polyorganocyclosiloxane, the method comprising the steps of:

providing a cyclic multi-siloxane having at least three repeating siloxane units where the cyclic multi-siloxane has the formula:

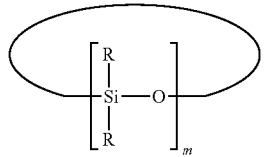

wherein each R is independently selected from H or a $C_2$ to $C_{30}$ alkyl group, and m represents a number of repeating units and is an integer that is equal to 3 or greater than or equal to 5;

functionalizing two Si atoms of the multi-siloxane with one carboxylate functional group each; and performing condensation of the functionalized cyclic multi-siloxane.

34. The method according to claim 33, further comprising the step of forming a moiety at Si atoms other than the functionalized Si atom of the cyclic multi-siloxane.

35. The method according to claim 33, wherein m is 5.

36. The method according to claim 33, wherein the step of performing condensation comprises the step of self condensing the functionalized cyclic multi-siloxane to form a polyorganocyclosiloxane.

37. The method according to claim 33, wherein the step of performing condensation comprises the step of co-condensing the functionalized cyclic multi-siloxane with a silanol-terminated polydialkylsiloxane to form a polyorganocyclosiloxane.

38. The method according to claim 37, wherein the silanol-terminated polydialkylsiloxane is selected from the group consisting of polydimethylsiloxane, polydiethylsiloxane, and polymethylphenylsiloxane.

* * * * *